(12) United States Patent
Brown et al.

(10) Patent No.: US 8,192,014 B1
(45) Date of Patent: Jun. 5, 2012

(54) OPTICAL DEVICE

(76) Inventors: Garrett W. Brown, Philadelphia, PA (US); Anthony D. Sacksteder, Philadelphia, PA (US)

(*) Notice: Subject to any disclaimer, the term of this patent is extended or adjusted under 35 U.S.C. 154(b) by 163 days.

(21) Appl. No.: 12/859,460

(22) Filed: Aug. 19, 2010

Related U.S. Application Data

(60) Provisional application No. 61/236,367, filed on Aug. 24, 2009.

(51) Int. Cl.
*G02C 9/02* (2006.01)

(52) U.S. Cl. ............ 351/59; 351/69; 351/107; 351/128; 351/158

(58) Field of Classification Search ............ 351/41, 351/59, 60, 64, 65, 69, 103, 107, 124, 128, 351/158, 178
See application file for complete search history.

(56) References Cited

U.S. PATENT DOCUMENTS

| 2,786,390 | A | * | 3/1957 | Zanetti | 351/59 |
| 3,990,788 | A | * | 11/1976 | Choy | 351/59 |
| 4,139,281 | A | | 2/1979 | Luttner | |
| 4,171,153 | A | | 10/1979 | Melluish | |
| 6,142,623 | A | | 11/2000 | Jones | |
| 6,705,720 | B2 | | 3/2004 | Brown | |

* cited by examiner

*Primary Examiner* — Huy K Mai
(74) *Attorney, Agent, or Firm* — Schnader Harrison Segal & Lewis LLP

(57) ABSTRACT

An optical device is disclosed having a supporting bar with a twisted configuration. At least one lens is slidably connected to the supporting bar such that the lens rotates when slid longitudinally along the supporting bar. The optical device further comprises a nose piece connected to the supporting bar, which may be stationary or adjustable with respect to the supporting bar. As the lens or lenses are slid along the supporting bar, they achieve a continuously changing angle relative to the nosepiece.

10 Claims, 5 Drawing Sheets

OPTICAL DEVICE

BACKGROUND OF THE INVENTION

FIGS. 1 and 2 depict a prior art optical device having a lens 102, a nosepiece 104, a weighted counterbalance 106, and a supporting bar 108. Supporting bar 108 interconnects nosepiece 106 between lens 102 and counterbalance 108. The entire device is designed to be supported and balanced on the bridge of the wearer's nose. To achieve this affect, at least one of the lens, the nosepiece, and the counterbalance is adjustably displaceable about the supporting bar for maintaining balance.

The counterbalance, as shown in FIGS. 1 and 2 is preferably positioned below the position of the lens at the opposite side. As with the lens, the counterbalance is preferably adjustable longitudinally along the supporting bar. Rotational adjustment may not be readily needed, but is certainly a possibility.

Supporting bar 108 is generally a laterally extending, elongated bar for supporting the other elements. In a single lens configuration, the lens is mounted near or at one end, and the counterbalance is mounted near or at the other end. Therebetween is the nosepiece. Prior art supporting bars were generally uniform in cross-section throughout the portion on which the lenses, counterbalance, and or nosepiece could slide, and had linear tangential, longitudinal surfaces. The supporting bar would, for example, have a circular cross-section throughout, such as a cylindrical rod. D-shaped cross-sectional bars were also used with the flat surface preferably facing the wearer and engaging internal springs or other securing devices in the nosepiece, lens or counterbalance.

The nosepiece is generally disposed midway between the lens and the counterbalance. This, however, need not always be the case. With heavier counterbalances, shorter distances can be achieved on the counterbalance side of the supporting wire. The appropriate weighting of the nosepiece, itself, can provide sufficient weight to act as the counterbalance.

SUMMARY

An optical device is disclosed having a supporting bar with a twisted configuration. At least one lens is slidably connected to the supporting bar such that the lens rotates when slid longitudinally along the supporting bar. The optical device further comprises a nose piece connected to the supporting bar, which may be stationary or adjustable with respect to the supporting bar. As the lens or lenses are slid along the supporting bar, they achieve a continuously changing angle relative to the nosepiece.

DESCRIPTION OF THE DRAWINGS

The invention is best understood from the following detailed description when read in conjunction with the accompanying drawings.

DETAILED DESCRIPTION OF THE INVENTION

Figure 1:
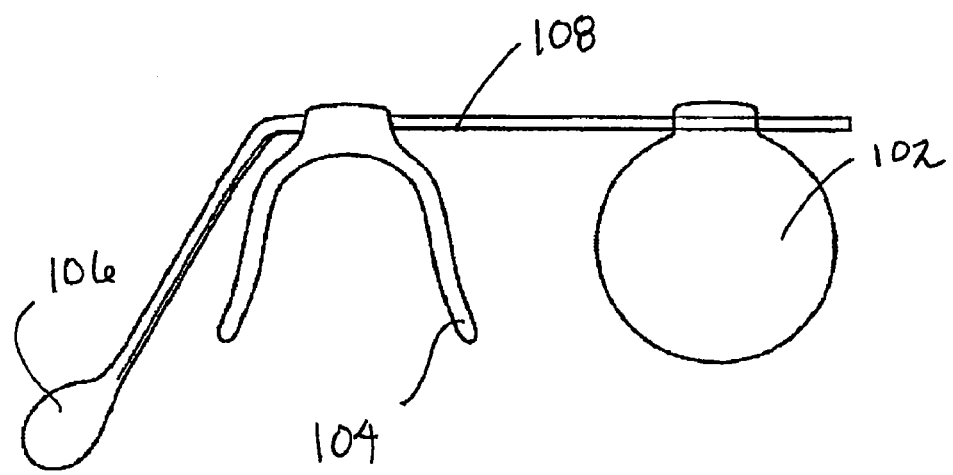
FIG. 1 shows a prior art optical device.
Figure 2:
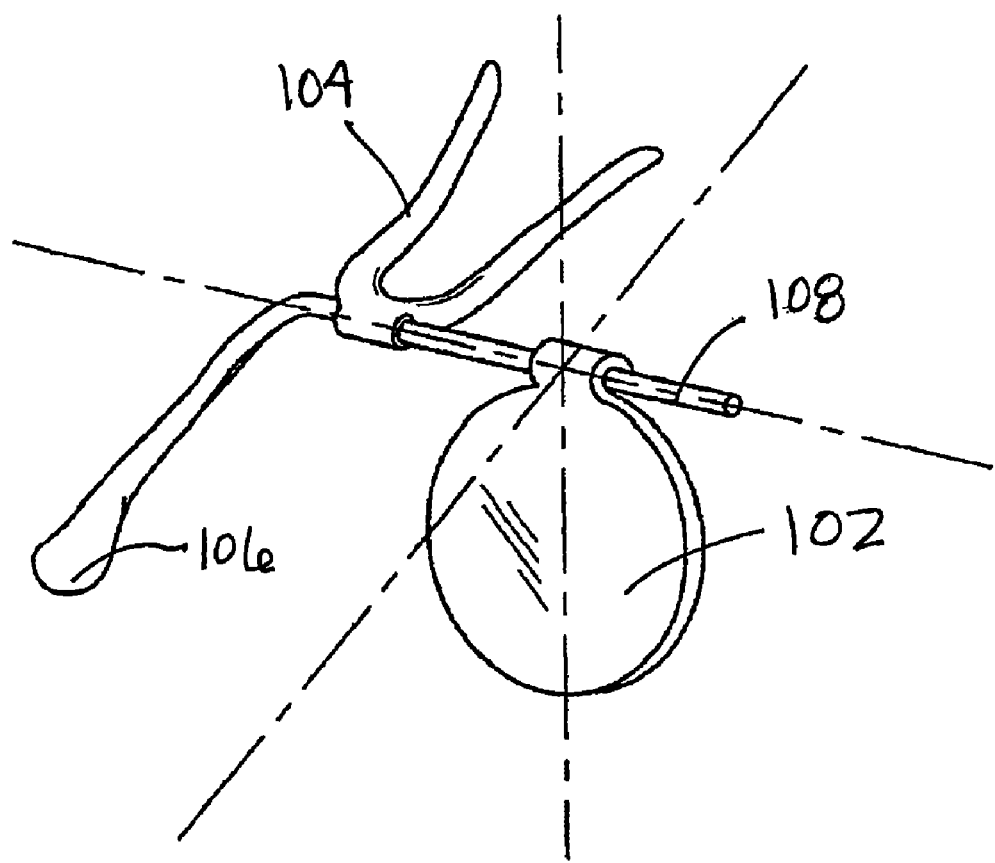
FIG. 2 is another view of the prior art optical device of FIG. 1.
Figure 3:
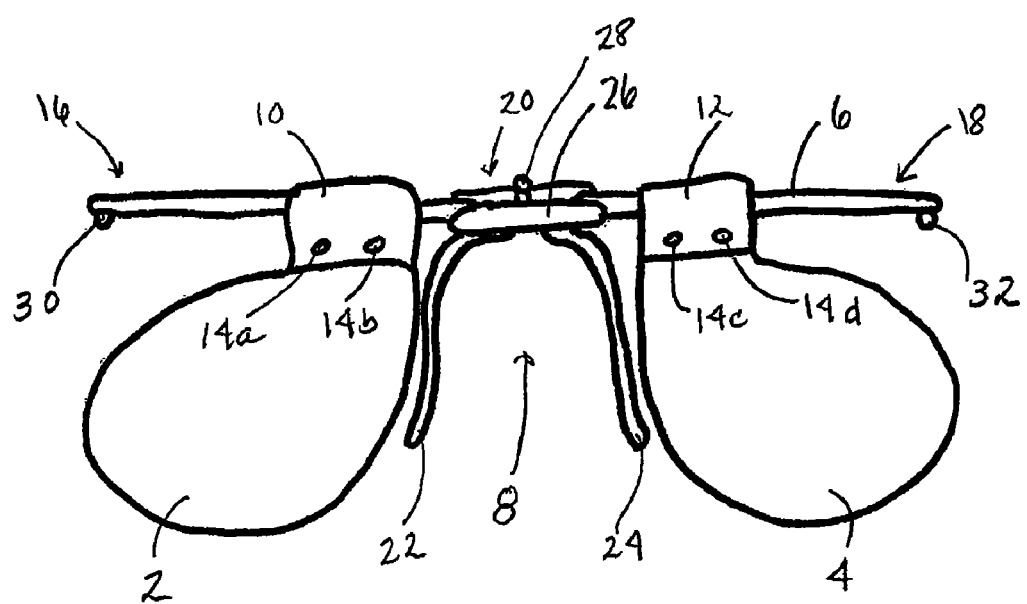
FIG. 3 depicts an optical device according to an illustrative embodiment of the invention.
Figure 4:
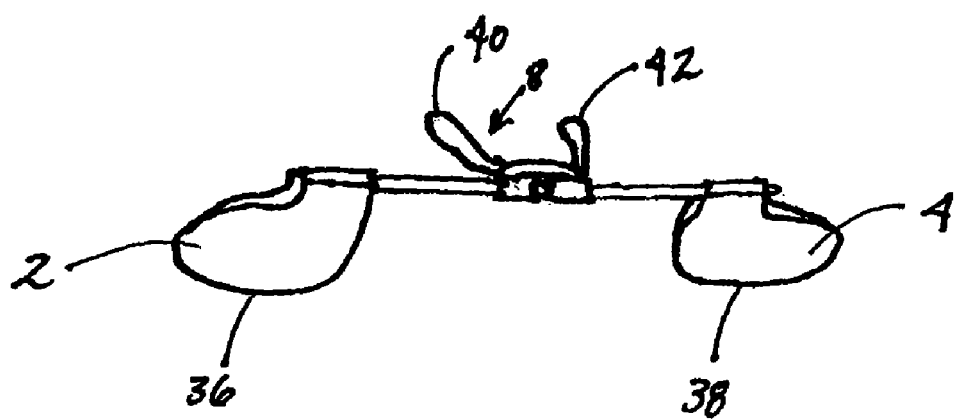
FIG. 4 depicts the optical device of FIG. 3 in a standing position.

FIGS. 3 and 4 depict an optical device according to an illustrative embodiment of the invention, which is suitable for use as reading glasses. Optical device 1 comprises two lenses 2, 4 slidably connected to a supporting bar 6. A nosepiece 8 is connected to supporting bar 6 between lenses 2, 4. In this particular embodiment, lenses 2, 4 are connected to supporting bar 6 by fasteners 10, 12 via rivets 14a-d.

Figure 5:
FIG. 5 depicts an optical device nosepiece according to an illustrative embodiment of the invention.

In the embodiment depicted in FIGS. 3 and 4, supporting bar 6 is formed from a metal strip that is initially flat, then twisted to form a spiral configuration or partial spiral configuration, as shown in FIG. 5. Thus, the plane of supporting bar 6 at ends 16, 18 may be rotated with respect to the plane of supporting bar 6 at its center 20, or with respect to other points on supporting bar 6. Preferably, the twist allows lenses 2, 4 to lie in substantially the same plane as nosepiece 8 when lenses 2, 4 are adjacent nosepiece 8, providing a compact, folded optical device as shown in FIG. 3. As lenses 2, 4 are slid apart they will automatically rotate out of the plane of nosepiece 8 according to the twist in supporting bar 6, which will generally provide a configuration suitable for use of the optical device. The degree of rotation can be based for example, on an individual's particular facial structure or preference. Illustrative ranges of rotation between the plane of nosepiece 8 and the plane of lenses 2, 4 when at ends 16, 18 include about 5° to about 75°; about 10° to about 55°; and about 20° to about 45°.

As noted above, FIG. 3 depicts an optical device wherein the lens(es) are in substantially the same plane as the plane of the nosepiece when the lens(es) are adjacent to the nosepiece and in a plane at an angle to the plane of the nosepiece when the lens(es) are displaced from the nosepiece. As shown in FIG. 4, there can be a position of the lenses along the supporting bar wherein a bottom edge 36, 38 of lenses 2, 4, respectively, and at least one bottom edge 40 or 42 of nose piece 8 are in substantially the same plane such that the device can be positioned on a substantially flat surface without any face of either lenses touching the flat surface.

Nosepiece 8 may be fixedly secured to supporting bar 6, or may also be slidably secured to supporting bar 6. In the illustrative embodiment shown in FIGS. 3 and 4, nosepiece 8 comprises two preferably mirror image sections 22, 24, each slidably secured to supporting bar 6. Resilient ring member 26 holds nosepiece halves 22, 24 together. A nosepiece stop 28, centers nosepiece halves 22, 24.

Supporting bar 6 preferably has stops 30, 32 at ends 16, 18 to guard against complete, inadvertent removal of lenses 2, 4. Supporting bar stops 30, 32 can be fixedly secured to supporting bar 6 or removable to allow replacement of lenses 2, 4. Stops can, for example, snap onto supporting bar 6, or screw onto it. Interchangeable lenses can provide different shapes, prescriptions, tints, or angles of orientation of lenses 2, 4 with respect to nosepiece 8. Interchangeability need not be associated with the stops, but can also be based on the lens attachment to an intermediate component or components, such as fasteners 10, 12, when configured to allow the lens to be releasable.

Nosepiece 6 is preferably flexible to allow adjustments to its curvature. This may be accomplished for example, by use of metals that will retain the curvature once bent, or by resilient materials that are biased to a particular curvature, but which curvature can be enlarged to fit various facial structures when in use. In addition to or in place of nosepiece 8, a fastener to attach the supporting bar to another device, such as glasses or other optical device may be included. The configuration of such as fastener would depend on to what the optical device is being attached.

The illustrative embodiment shown in FIGS. 3 and 4 includes a metal supporting bar and nosepiece and plastic lenses. Other materials however, are within the scope of the invention. Any or all the supporting bar, nosepiece, supporting bar fasteners can be plastic for example. The lenses can be plastic or glass. The lenses may be integral with supporting bar fasteners or separate components. The lenses can have a variety of shapes, thicknesses and prescriptions.

Preferably, each component is independently adjustable with respect to the others. A lengthwise adjustment also allows for accommodation of different spacing between eyes.

The supporting bar may be provided with one or more detents for locking the various components into preferred arrangements. For example, detents are provided at various positions along the supporting bar corresponding to possible distances between the eyes and nose, and corresponding to wearable positions and storage positions. Once the lens is properly positioned, the system may be balanced, if a balancing component is included.

The lens itself is preferably made of optical grade acrylic. The acrylic is both lightweight and strong. The size of the lens may vary to accommodate the size of the wearer's eye, but need not be as large as conventional lenses or even their "half-moon" cousins. Instead, because the lens is typically worn for relatively short periods of time, and immediately in front of the eye, it can be considerably smaller. Diameters of approximately 0.75 inch have been found to be effective. Of course, the relative strength of the lens can be adjusted during fabrication by known techniques.

The lens may be for example, generally circular in shape, having a tab-like extension at an upper edge. The tab-like extension defines a channel through which the supporting bar extends. In an illustrative embodiment, this channel is provided with one or more detents corresponding to prearranged, preferred displacement positions. These detents may work alone or in combination with mating elements on the supporting bar. The two lenses will generally be symmetrically displaced from the nosepiece, but asymmetrical arrangements are possible to maintain balance or comfort where the contours of the wearer's face demands.

The nosepiece is generally U-shaped for receiving the bridge of the wearer's nose, but can be worn lower on the nose. A channel is provided in the nosepiece for accepting the supporting bar therethrough, or it is secured to an attachment component of that configuration. As with the lens(es), the nosepiece is adjustable along and about the supporting bar. Like the lens, the nosepiece may be supplied with detents or other means for locking it into preferred locations.

The nosepiece can be made of resilient or deformable material. The resilient nature of such a nosepiece allows it to have gripping action on the nose, rather than relying solely on the balancing effect of the system.

The elements of the eyewear are generally adjustable between at least two positions. The first position is adapted for storage. When the nosepiece, lens, and counterbalance, if included, are rotated such that they are in planar alignment, a relatively small and slim package results. The folded device may be easily stored in a wallet or other small enveloping structure. The other position or positions corresponds to wearable positions.

Various embodiments of the invention have been described, each having a different combination of elements. The invention is not limited to the specific embodiments disclosed, and may include different combinations of the elements disclosed, and elements of the disclosed prior.

The invention may be embodied in a variety of ways, for example, an optical device, such as reading, magnifying or protective glasses, method for using the same and methods for manufacturing the same, etc.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. An optical device comprising:
a supporting bar having a twisted configuration;
at least one lens slidably connected to the supporting bar such that the lens rotates when slid longitudinally along the supporting bar.

2. The optical device of claim 1 further comprising:
a nosepiece connected to the supporting bar.

3. The optical device of claim 2 wherein the lens(es) are in substantially the same plane as the plane of the nosepiece when the lens(es) are adjacent to the nosepiece and in a plane at an angle to the plane of the nosepiece when the lens(es) are displaced from the nosepiece.

4. The optical device of claim 2 wherein there is a position of the lenses along the supporting bar wherein a bottom edge of the lenses and a bottom edge of the nose piece are in substantially the same plane such that the device can be positioned on a substantially flat surface without any face either lenses touching the flat surface.

5. The optical device of claim 2 wherein the nosepiece comprises:
two sections, each slidably secured to the supporting bar;
a resilient ring member positioned to hold the nosepiece sections together;
a nosepiece stop to center the nosepiece sections.

6. The optical device of claim 1 comprising:
two lenses slidably connected to the supporting bar such that the lenses rotate when slid longitudinally along the supporting bar; and
a nosepiece disposed between the lenses.

7. The optical device of claim 1 wherein the device is a pair of reading glasses.

8. The optical device of claim 1 further comprising a one or more stops attached to the supporting bar to prohibit the lens(es) from being removed from the supporting bar.

9. The optical device of claim 8 wherein the stops are removable, to allow a lens to be removed.

10. The optical device of claim 1 further comprising:
a counterbalance attached to the supporting bar;
wherein at least one of the lens, the nosepiece, and the counterbalance is adjustable with respect to the supporting bar for maintaining balance of the optical device on a wearer's nose.

* * * * *